United States Patent Office 3,302,172
Patented Jan. 31, 1967

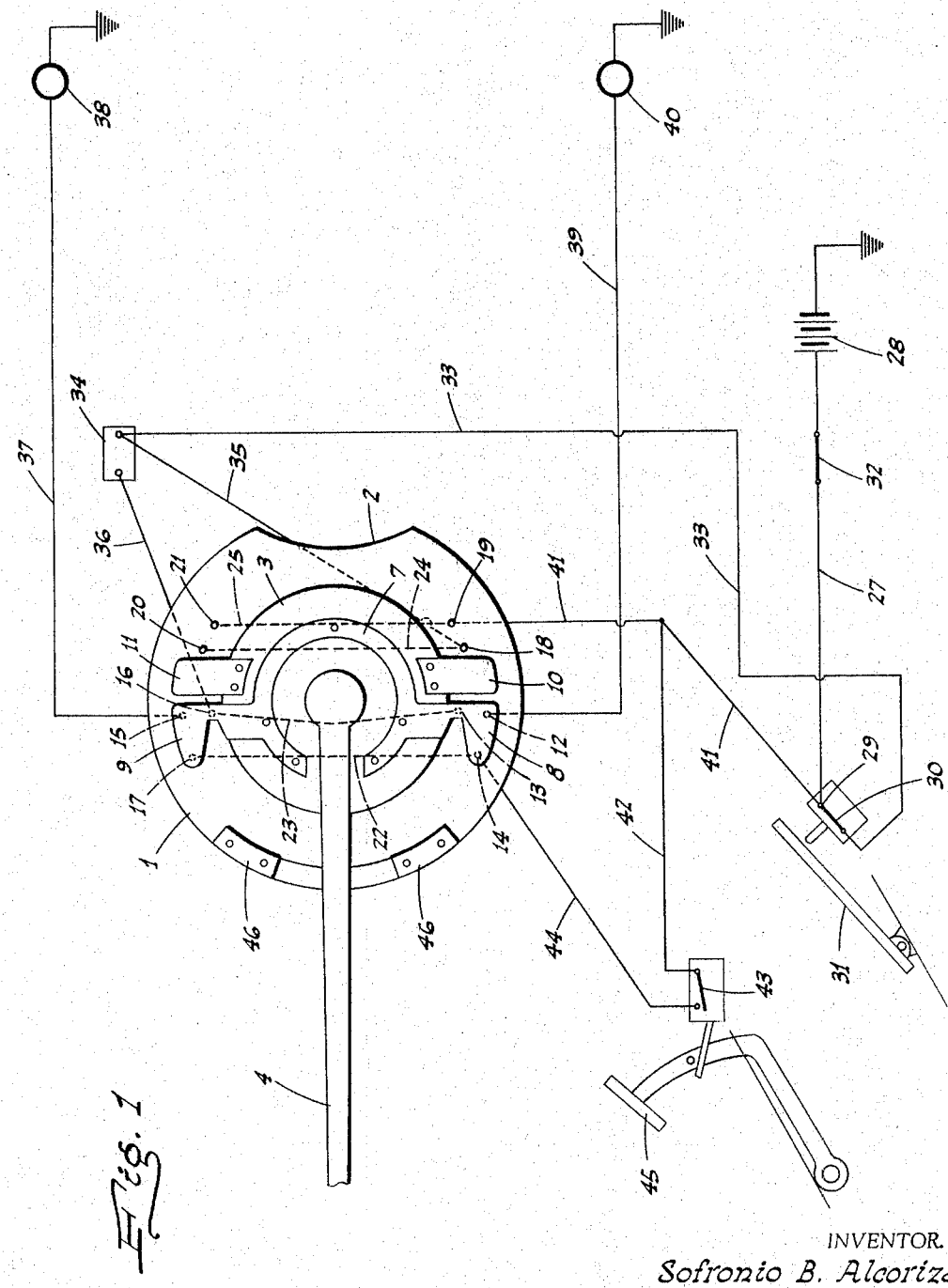

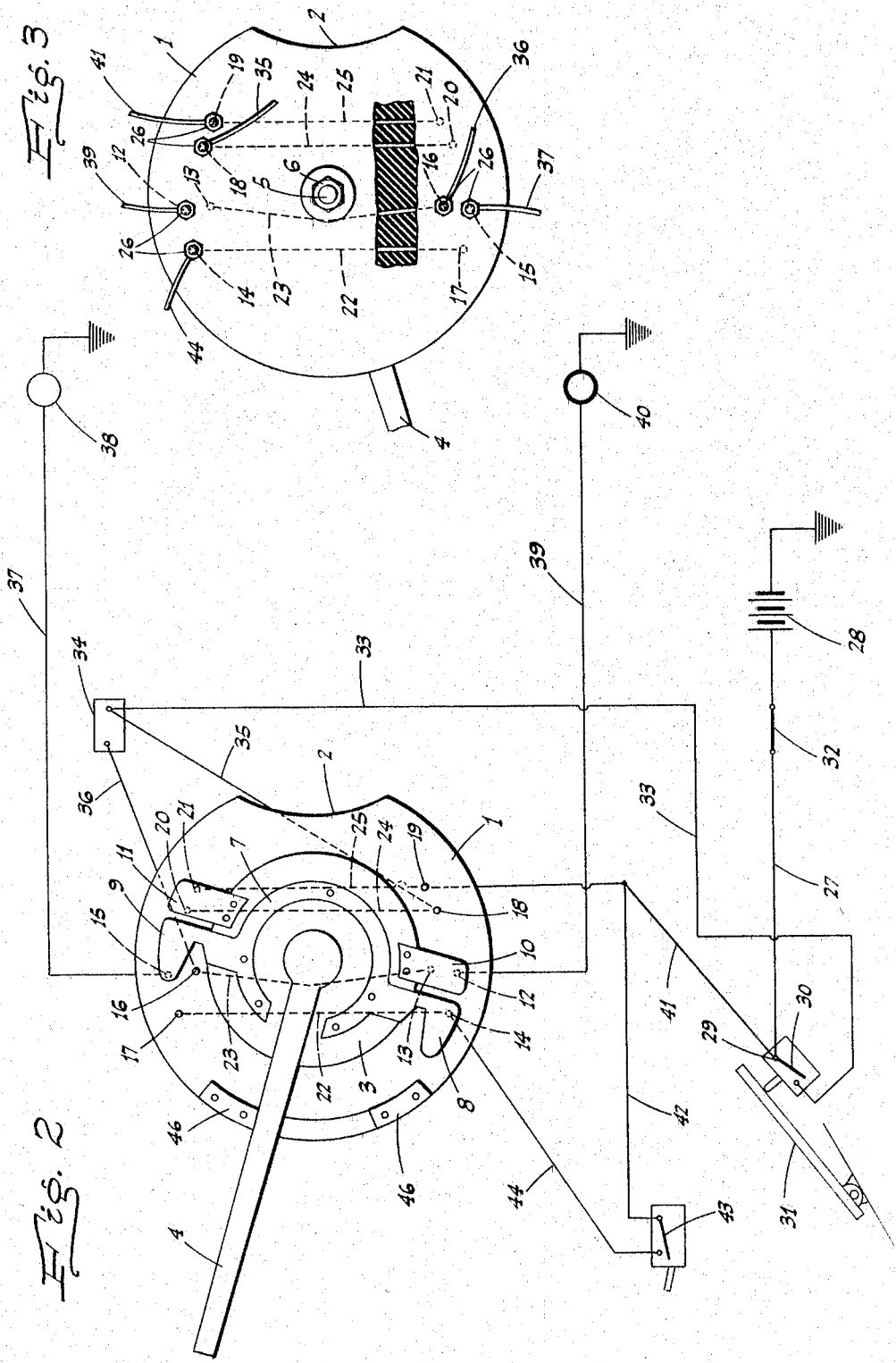

3,302,172
SIGNAL SYSTEM FOR MOTOR VEHICLES
Sofronio B. Alcoriza, P.O. Box 397,
Walnut Grove, Calif. 95690
Filed Aug. 27, 1963, Ser. No. 304,784
2 Claims. (Cl. 340—72)

This invention relates to signal systems for motor vehicles, and particularly to a system in which electric warning lights are energized to indicate different phases of operation or movement of a motor vehicle.

A major object of this invention is to provide a signal system which will cause a visual flashing signal to be given at the rear end of the motor vehicle whenever the driver takes his foot off, or removes the gas feeding pressure from, the accelerator or gas pedal of the vehicle. In this manner, the driver of a following vehicle is apprised that the vehicle ahead is slowing down for some reason, and may then control his own vehicle accordingly.

The flashing signal, as above, is given by means of a pair of signal lights mounted on the rear of the vehicle, and a further object of the invention is to arrange the signal system so that one or the other of these same lights is utilized in giving a turn-signal, and such one light only will be flashed regardless of whether the gas pedal is depressed or is relieved of pressure.

Still another object of the invention is to arrange the signal system so that both such signal lights will be illuminated with a steady and non-flashing glow whenever the brakes on the vehicle are applied, and irrespective of the position of the accelerator pedal at the time.

A further object of the invention is to provide a signal system for motor vehicles which is designed for ease and economy of manufacture.

A still further object of the invention is to provide a practical, reliable, and durable signal system for motor vehicles, and one which is exceedingly effective for the purpose for which it is designed.

These objects are accomplished by means of such structure and relative arrangement of parts as will fully appear by a perusal of the following specification and claims.

In the drawings:

FIG. 1 is a plan view of the turn-signal setting device of the system in a neutral position and shown in connection with the electric circuiting of the system; the latter including a gas pedal actuated switch and a separate brake pedal actuated switch, the former being closed when the gas pedal is retracted, while the latter is open when the brake pedal is released.

FIG. 2 is a similar view but shows the turn-signal setting device as set to give a right hand signal, and with the gas pedal actuated switch open, as when said pedal is depressed.

FIG. 3 is a bottom plan view of the base member of the turn-signal setting device.

Referring now more particularly to the drawings and to the characters of reference marked thereon, the turn-signal setting device comprises a base member 1 of insulation material, and preferably formed on one side with an arcuate concave edge portion 2 of a size to fit about the steering column of a motor vehicle so that the base may be suitably strapped or otherwise secured to such column and thus held against movement.

The base 1 is preferably circular, and mounted on said base centrally thereof is a smaller disc 3, forming part of a switch and from which a radial handle 4 projects in a direction opposite the concave edge portion 2. The handle 4 is rigid with the disc 3, and both are turnably mounted on the base 1 by means of a pin 5 depending through the disc and base centrally thereof, and held against axial movement by a nut 6 on the pin engaging the bottom surface of the base, as shown in FIG. 3.

Mounted on the disc 3, which also is of insulation material is a metal ring 7 of smaller size than said disc and cut away to avoid contact with the handle 4 which is of metal. Formed with or at least rigidly secured to the ring 7 are opposed contact plates 8 and 9 of identical form which overlie the base 1 radially out from the disc 3; said plates being disposed in a plane at right angles to the axial plane of the handle 4.

Secured on the disc 3, clear of the ring 7 and plates 8 and 9 and disposed to the side of said plates away from the handle 4, are other opposed contact plates 10 and 11, which also project outwardly from said disc 3 and overlie the base 1.

Mounted in the base 1 and projecting from the upper face thereof for engagement either with the plate 8 or the plate 10, are contacts 12, 13 and 14, positioned to be all engaged by plate 8 when the handle 4 is in a central or neutral position. Similar contacts 15, 16 and 17 are mounted in the base 1 on the opposite side thereof for engagement either with the plate 9 or the plate 11, and positioned to be all engaged by plate 9 when the handle 4 is in said neutral position.

A pair of contacts 18 and 19 is mounted in the base 1 to the side of the plate 10 opposite the plate 8 and normally clear of said plate 10 but positioned to be engaged thereby when the disc 3 is rotated in one direction from its neutral position. A similar pair of contacts 20 and 21 is mounted in the base 1 to the side of the plate 11 opposite the plate 9. These contacts are also normally clear of the plate 11, but are positioned to be engaged thereby when the disc 3 is rotated in the opposite direction from its neutral position.

The contacts 14 and 17 are connected by a wire 22; contacts 13 and 16 are connected by a wire 23; contacts 18 and 20 are connected by a wire 24; and contacts 19 and 21 are connected by a wire 25. All of said wires are separated from each other and are disposed either below the base 1 or embedded therein as shown in FIG. 3. The contacts 12, 14, 15, 16, 18 and 19 are each provided, on the underside of the base 1, with a terminal 26 for exterior wiring connection.

The various contacts are connected to and interposed in a signal light and circuit arrangement as follows:

A feed wire 27 leads from the battery 28 of the vehicle to one terminal 29 of a normally closed switch 30, said switch being arranged to be opened by and upon depression of the conventional accelerator or gas pedal 31 of the vehicle. The wire 27 is wired in connection with the engine ignition switch 32 of the vehicle, so as to be de-energized when said switch is open. From the other terminal of the switch 30, another wire 33 leads to a connection with one terminal of a conventional flasher or circuit interrupter 34. From said one terminal of the flasher 34, a wire 35 leads to the terminal 26 of contact 18. Another wire 36 leads from the other terminal of the flasher 34 to a connection with the terminal 26 of contact 16.

A wire 37 leads from the terminal 26 of contact 15 to a signal light 38, while another wire 39 leads from the terminal 26 of contact 12 to another signal light 40; the lights 38 and 40 being on opposite sides of the vehicle at the rear. As is the customary practice in the automotive industry, the signal lights 38 and 40 are grounded, as is the battery 28. Other signal lights on the front end of the vehicle may, of course, be connected to the respective wires 37 and 39 without any changes in the above described circuiting being required.

In connection with such circuiting, another feed or live wire 41 leads from a connection with wire 27 (as at the terminal 29 of switch 30) to a connection with the terminal 26 of contact 19. A branch wire 42 leads from a connection with wire 41 to one terminal of a normally open switch 43, the other terminal of which is connected by a wire 44 to the terminal 26 of contact 14. The switch 43 is of a type commonly used in connection with the brake pedal 45 of a motor vehicle, being closed by and upon the depression of such pedal to apply the brakes on the vehicle.

OPERATION

Assuming that the switch 32 is closed and that depressing pressure has been removed from the gas pedal 31, as when the vehicle is being allowed to slow down without or before brake application, and without any direction signal being given (all as indicated in FIG. 1) a flashing or automatically interrupted circuit is closed through both lights 38 and 40. To this end, current flows from the battery 28 through wire 27, the closed switch 30, and the wire 33 to the flasher 34. From the flasher the current travels through wire 36 to the contact 16 and is transmitted, not only to the plate 9 with which the contact 16 is engaged, but also to the opposite plate 8 which is electrically connected to the plate 9 by the ring 7. The current then flows through contact 15, which is engaged by the plate 9, and thence to the light 38 through wire 37. At the same time, the current also flows to the light 40 through wire 39 and the contact 12 which is engaged with the plate 8. Both lights will, therefore, flash on and off simultaneously and so continue for the period that the switch 30 remains closed, and which is as long as the pedal 31 is not depressed and the vehicle speeded up again.

When a turning signal is to be given while the vehicle is still moving ahead under power—which, of course, is when the pedal 31 is depressed and the switch 30 is open—the handle 4 is moved a certain distance to one side or the other of its neutral position, and according to which side the vehicle is to be turned. The extent of turning movement of the handle is limited by suitable means, such as a stop quadrant 46 mounted on the base 1.

Such a positioning of the handle 4 and pedal 31 is shown in FIG. 2, and the one light 40 only, and which corresponds to the position of the handle as shown, will be energized with a flashing effect and by reason of closing a circuit from the feed wire 27 and to the light 40 in the following manner:

From the terminal 29 of switch 30, the current flows through wire 41 to contact 19, and thence to contact 21 through wire 25. Since said contact 21 is now engaged by plate 11, the current flows from contact 21 to contact 20, and thence to contact 18 through wire 24. From contact 18, the current flows through wire 35 to one terminal of the flasher 34, thence from the flasher through wire 36 to contact 16, and to the opposite contact 13 through wire 23. The contact 13, as well as the contact 12, are then both engaged by the contact plate 10, and hence are in electrical communication with each other. The current thus flows from contact 12 through wire 39 to the light 40, completing the circuit to said light, which functions with a flashing effect. A similar circuit to that above described, will be closed to the light 38 only when the handle 4 is moved to the opposite position relative to the neutral position thereof.

Should it be desired to give a signal indicating that the brakes are being applied and at which time the gas pedal 31 is customarily relieved of pressure so that the switch 30 is closed and the brake pedal is depressed so that the switch 43 is also closed, the following flasher-bypassing circuit to both lights 38 and 40 is closed, assuming that the handle 4 is in the neutral position as shown in FIG. 1. Current flows from wire 27 through the adjacent portion of wire 41, through wire 42, the switch 43, and wire 44 to contact 14. The current also flows to the opposite contact 17 through the connecting wire 22. Since the contacts 14 and 17, as well as the contacts 12 and 15 of the light wires 39 and 37, respectively, are engaged by the respective contact plates 8 and 9, both lights 38 and 40 will be simultaneously energized, and will continue to give a stop signal as long as the switch 43 remains closed.

It will be noted that the lights 38 and 40 will then emit a steady rather than a flashing light, even though the flashing circuit to the lights is also closed by reason of the switch 30 being closed. This is for the reason that the steady current passing through the switch 43 to the lights 38 and 40 will offset or counteract the intermittent current caused by the interposition of the flasher 34 in the circuit of which the switch 30 is a part.

Should it be necessary to apply the brakes when a flashing turning signal is being given, and when the light 40, for example, is energized as shown in FIG. 2, the current then flows through the closed switch 43 and through wire 44 to contact 14, which is still engaged by the contact plate 8. The current then flows through said plate 8, the ring 7 and the opposite contact plate 9 to the contact 15 which is engaged by said plate. The circuit to light 38 is thus closed from said contact 15 through wire 37, and said light will be energized with a steady as distinguished from a flashing glow.

When the handle 4 is set in the opposite position so that the flashing circuit is closed through the light 38, a circuit generally the same as that above described will be closed, when the brakes are applied, to the opposite light 40.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A signal system for a motor vehicle having a depressible accelerator pedal, the system comprising, with a pair of electric lights exposed at one end of the vehicle, a fixed base of insulation material, a switch-forming disc of insulation material turnably mounted on the base and having a radial handle projecting therefrom for controlling the rotation of the disc, stop means on the base engageable with the handle and limiting the extent of rotation of the disc on opposite sides of a neutral position of the handle and disc, connected contact plates projecting from opposite sides of the disc and disposed in a plane at right angles to the handle, other and separated contact plates projecting from opposite sides of the disc adjacent and disposed to the side of the first named contact plates furthest from the handle, a circuit for the lights comprising, with an initially closed switch positioned and arranged to be opened by and upon depression of the accelerator pedal, a feed wire leading to one terminal of the switch, an interrupter to one terminal of which the feed wire extends from the other terminal of the switch, a second wire leading from said one terminal of the interrupter to first and second connected contacts on the base in sequence on opposite sides of the disc beyond and clear of said other contact plates when the disc is in said neutral position, a third wire leading from the other terminal of the interrupter to third and fourth connected contacts in sequence on the base positioned to be engaged by the first named contact plates when the disc is in said neutral position, a fourth wire leading from a fifth contact on the base to one light, and a fifth wire leading from a sixth contact on the base to the other light, said fifth and sixth contacts being spaced radially of the disc from the third and fourth contacts, respectively, and being engaged by the first named contact plates when the disc is in said neutral position; the various contacts being arranged and relatively positioned so that when the disc is rotated to the point that the handle engages the stop means to one side of the neutral position of said handle, the second contact will be engaged by the corresponding one of said other contact plates while the third contact, on the same side of the disc as the second contact, becomes disengaged from the adjacent one of the first named contact plates and the fifth contact remains engaged therewith, and the fourth and sixth contacts, on the opposite side of the disc, become disengaged from the corresponding one of the first named contact plates and become engaged by the related one of the second named contact plates and the first named contact becomes disengaged from the latter plate.

2. A signal system, as in claim 1, with contacts on the base on opposite sides of the disc in position for engagement by corresponding ones of the first named contact plates when said plates and disc are in a neutral position, and a normally open switch in the other circuit adapted to be closed by depression of the brake pedal of the vehicle.

References Cited by the Examiner
UNITED STATES PATENTS

| | | | |
|---|---|---|---|
| 2,810,899 | 10/1957 | Foster | 340—72 |
| 2,835,880 | 5/1958 | Daws | 340—67 |
| 2,957,161 | 10/1960 | Daws | 340—72 |
| 3,008,121 | 11/1961 | Ellithorpe | 340—72 |

NEIL C. READ, *Primary Examiner.*

T. A. ROBINSON, *Examiner.*